(12) United States Patent
Hayano et al.

(10) Patent No.: US 9,007,552 B2
(45) Date of Patent: Apr. 14, 2015

(54) LIQUID CRYSTAL DISPLAY DEVICE

(75) Inventors: Takayuki Hayano, Osaka (JP);
Masayuki Tsuji, Osaka (JP); Kohji Hayashi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 224 days.

(21) Appl. No.: 13/806,941

(22) PCT Filed: Jun. 17, 2011

(86) PCT No.: PCT/JP2011/003472
§ 371 (c)(1),
(2), (4) Date: Feb. 13, 2013

(87) PCT Pub. No.: WO2011/161921
PCT Pub. Date: Dec. 29, 2011

(65) Prior Publication Data
US 2013/0208216 A1   Aug. 15, 2013

(30) Foreign Application Priority Data
Jun. 23, 2010   (JP) .................. 2010-143048

(51) Int. Cl.
*G02F 1/1337* (2006.01)
*G02F 1/1335* (2006.01)
*G02F 1/137* (2006.01)

(52) U.S. Cl.
CPC .... *G02F 1/133753* (2013.01); *G02F 1/133528* (2013.01); *G02F 2001/133773* (2013.01); *G02F 1/1337* (2013.01); *G02F 1/133784* (2013.01); *G02F 2001/133742* (2013.01); *G02F 2001/133746* (2013.01); *G02F 2001/133757* (2013.01); *G02F 2001/13712* (2013.01); *G02F 2203/64* (2013.01)

(58) Field of Classification Search
CPC .......................................... G02F 2001/133773
USPC .................................................. 349/128, 129
See application file for complete search history.

(56) References Cited

U.S. PATENT DOCUMENTS

| 5,710,611 A | 1/1998 | Suzuki et al. |
| 2005/0117100 A1 * | 6/2005 | Terashita et al. .............. 349/129 |

FOREIGN PATENT DOCUMENTS

| JP | 8-146428 | 6/1996 |
| JP | 2005-292302 | 10/2005 |
| JP | 2007-256811 | 10/2007 |
| JP | 2007-298842 | 11/2007 |

* cited by examiner

OTHER PUBLICATIONS

International Search Report for PCT/JP2011/003472, mailed Aug. 2, 2011.

*Primary Examiner* — Wen-Ying P Chen
(74) *Attorney, Agent, or Firm* — Nixon & Vanderhye, P.C.

(57) ABSTRACT

A normally black liquid crystal display device includes a liquid crystal layer in which liquid crystal molecules are arranged vertically when no voltage is applied, and arranged horizontally by applying a voltage. In each of pixel regions in alignment films which are segmented in a grid by source lines and gate lines, is divided into two along a direction parallel to the source lines. The first alignment film includes a first region and a second region. The second alignment film includes a third region facing the first region and a fourth region facing the second region. In an adjacent pair of the pixel regions, pairs of the regions are adjacent to each other with corresponding one of the source lines interposed therebetween.

2 Claims, 19 Drawing Sheets

LIQUID CRYSTAL DISPLAY DEVICE

This application is the U.S. national phase of International Application No. PCT/JP2011/003472, filed 17 Jun. 2011, which designated the U.S. and claims priority to Japan Application No. 2010-143048, filed 23 Jun. 2010, the entire contents of each of which are hereby incorporated by reference.

TECHNICAL FIELD

The present invention relates to normally black liquid crystal display devices using a VA mode.

BACKGROUND ART

A document (Patent Document 1) related to the present invention shows a liquid crystal display element in a normally black mode (i.e., the mode in which a screen is displayed in black when no voltage is applied) without using a black mask (i.e., a light shielding layer provided between pixels).

The liquid crystal display element includes, between a pair of transparent substrates, active matrix liquid crystal cells including a liquid crystal layer in a VA mode (i.e., the mode in which liquid crystal molecules are aligned perpendicular to a substrate), a pair of polarizing plates arranged with the liquid crystal cells interposed therebetween, two λ/4 plates, each of which is arranged between one of the polarizing plates and the liquid crystal cells.

By applying a voltage to the liquid crystal cells, the liquid crystal molecules lie down and are aligned in the horizontal direction. In order to keep the alignment directions of the liquid crystal molecules uniform, rubbed vertical alignment films are formed on the inner surfaces of the pair of transparent substrates to be parallel to each other in opposite directions. However, no alignment division is performed.

As a technique for improving viewing angle characteristics, alignment division is known, in which each pixel is divided into regions having different alignment directions.

CITATION LIST

Patent Document

PATENT DOCUMENT 1: Japanese Patent Publication No. 2005-292302

SUMMARY OF THE INVENTION

Technical Problem

Compared to a conventional liquid crystal display device in a normally white mode (i.e., the mode in which a screen is displayed in white when no voltage is applied) using a TN mode, a normally black liquid crystal display device using a VA mode like Patent Document 1 provides high-contrast display. However, the latter case has the disadvantage of poorer light transmittance than the former and the tendency that the screen becomes dark, when the screen is displayed in white. In order to address the problems, the latter liquid crystal display device increases an output of a backlight and provides brightness similar to that of the TN mode.

The liquid crystal display element of Patent Document 1 has a disadvantage in viewing angle characteristics. However, when alignment division is performed to improve the viewing angle characteristics, light transmittance is reduced by disorder of the alignment directions of the liquid crystal molecules, thereby making the screen darker.

It is an objective of the present invention to improve viewing angle characteristics and to mitigate reduction in light transmittance in a normally black liquid crystal display device using a VA mode.

Solution to the Problem

In order to achieve the objective, the present invention provides creative alignment division to mitigate reduction in light transmittance.

A normally black liquid crystal display device according to the present invention includes a first substrate; a second substrate facing the first substrate; a liquid crystal layer sealed between the first substrate and the second substrate; a first polarizing plate provided on the first substrate; and a second polarizing plate provided on the second substrate.

The first substrate includes, on a facing surface, a plurality of source lines extending in parallel, a plurality of gate lines extending orthogonal to the source lines, a plurality of pixel electrodes provided to correspond to pixel regions segmented in a grid by the source lines and the gate lines, and a first alignment film in contact with the liquid crystal layer. The second substrate includes, on a facing surface, a single common electrode facing the pixel electrodes, and a second alignment film in contact with the liquid crystal layer.

The liquid crystal layer includes liquid crystal molecules arranged so that a light transmission axis orthogonal to the facing surfaces of the substrates substantially coincides with long axes of the molecules when no voltage is applied between the pixel electrodes and the common electrode. The liquid crystal molecules are aligned so that the long axes of the molecules are substantially orthogonal to the light transmission axis by application of a voltage.

Assume that each of the pixel regions in the first alignment film and the second alignment film is divided into regions along a direction parallel to either one of the source lines or the gate lines, each of the pixel regions in the first alignment film includes a first region and a second region, and each of the pixel regions in the second alignment film includes a third region facing the first region and a fourth region facing the second region.

At this time, at least one pair of the first region and the second region, or the third region and the fourth region has different directions of alignment treatment. In an adjacent pair of the pixel regions, pairs of the first regions, the second regions, the third regions, and the fourth regions are adjacent to each other with corresponding one of the lines interposed therebetween.

In the liquid crystal display device, the alignment division is performed at first, thereby improving the viewing angle characteristics. When the alignment division is performed, misalignment of the liquid crystal molecules causes reduction in the light transmittance. In this liquid crystal display device, however, a combination of alignment division mitigates the reduction in the light transmittance occurring at the boundaries between source lines etc. and the corresponding pixel regions.

That is, in an adjacent pair of the pixel regions, the pairs of the regions having the same direction of alignment treatment are adjacent to each other with the corresponding one of the source lines or the gate lines interposed therebetween, which is parallel to the direction of alignment division. Thus, the liquid crystal molecules above the source lines and the boundaries between the source lines and the corresponding pixel regions are aligned similarly to cause less misalignment under the influence of the regions on the both sides having the same alignment direction. As a result, the reduction in the light transmittance at the boundaries between the source lines and the corresponding pixel regions is mitigated, thereby improving the brightness of the pixel regions.

More specifically, the first region and the second region are preferably formed to have opposite directions of alignment treatment. The third region and the fourth regions are preferably formed to have opposite directions of alignment treatment.

Then, the advantages of the alignment division are efficiently provided, thereby further improving the viewing angle characteristics.

Still more specifically, for example, the first region and the third region may be subjected to alignment treatment in opposite directions. The second region and the fourth region may be subjected to alignment treatment in opposite directions. As viewed from the light transmission axis, the first polarizing plate may be provided so that an absorption axis direction of the first polarizing plate is substantially shifted from the direction of alignment treatment of the first alignment film by an angle of 45°, and the second polarizing plate may be provided so that an absorption axis direction of the second polarizing plate is orthogonal to the absorption axis direction of the first polarizing plate.

Alternatively, the first region and the third region may be subjected to alignment treatment in orthogonal directions. The second region and the fourth region may be subjected to alignment treatment in orthogonal directions. As viewed from the light transmission axis, the first polarizing plate may be provided so that an absorption axis direction of the first polarizing plate coincides with the direction of alignment treatment of one of the first alignment film or the second alignment film, and the second polarizing plate may be provided so that an absorption axis direction of the second polarizing plate is orthogonal to the absorption axis direction of the first polarizing plate.

Advantages of the Invention

As described above, according to the present invention, reduction in light transmittance is mitigated, while improving viewing angle characteristics, by effectively combining alignment division in a normally black liquid crystal display device using a VA mode.

DESCRIPTION OF EMBODIMENTS

Industrial Applicability

Embodiments of the present invention will be described in detail hereinafter with reference to the drawings. The following description is essentially illustrative only and should not be taken as limiting the invention, equivalents, or the usage.

First Embodiment

Figure 1:
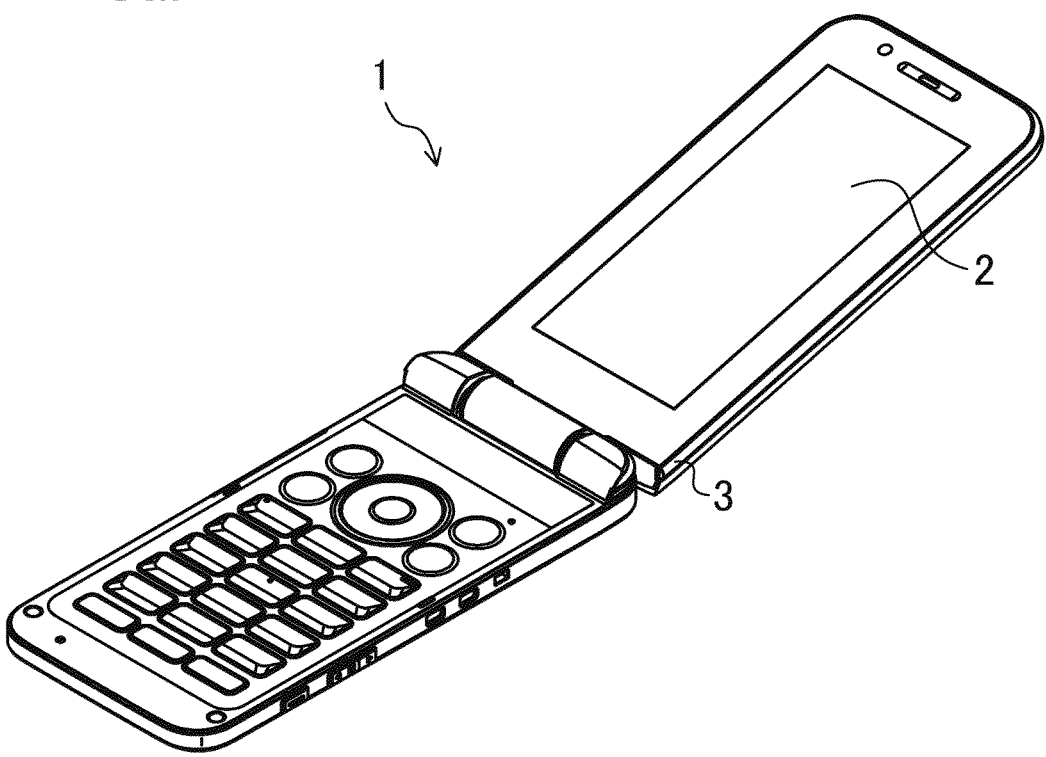
FIG. 1 is a schematic perspective view illustrating a liquid crystal display device according to a first embodiment.

FIG. 1 illustrates a liquid crystal display device 1 according to this embodiment. The liquid crystal display device 1 is, for example, a personal digital assistance such as a mobile phone, and has the function of displaying still images and moving images in color by active matrix drive. The liquid crystal display device 1 includes a display panel (or simply referred to as a panel 2), and a body case 3 storing the panel 2. Although not shown, the body case 3 includes therein various types of hardware, software, batteries, etc., for driving and controlling the panel 2.

Figure 2:
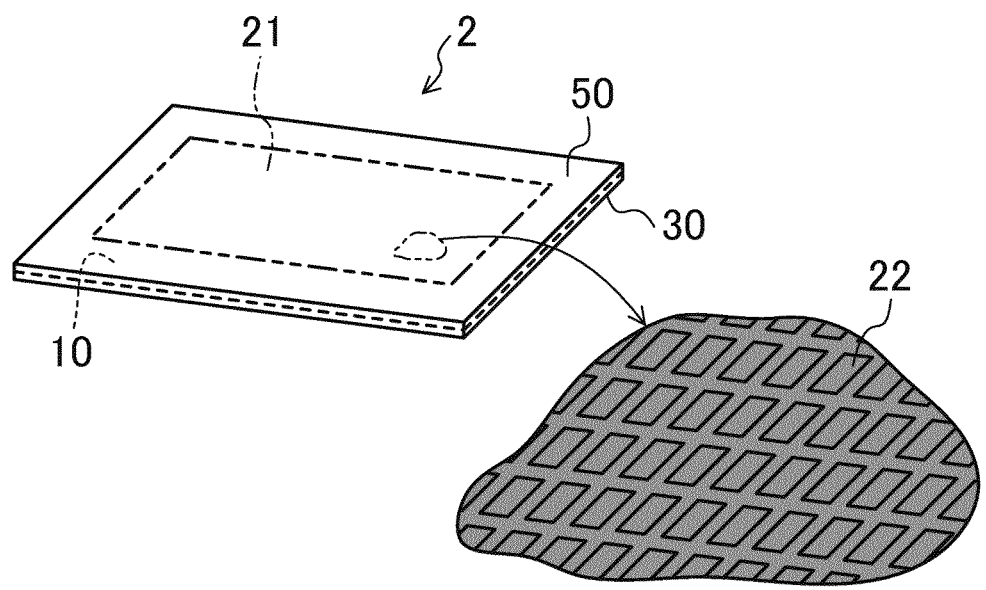
FIG. 2 is a schematic perspective view illustrating a display panel.
Figure 3:
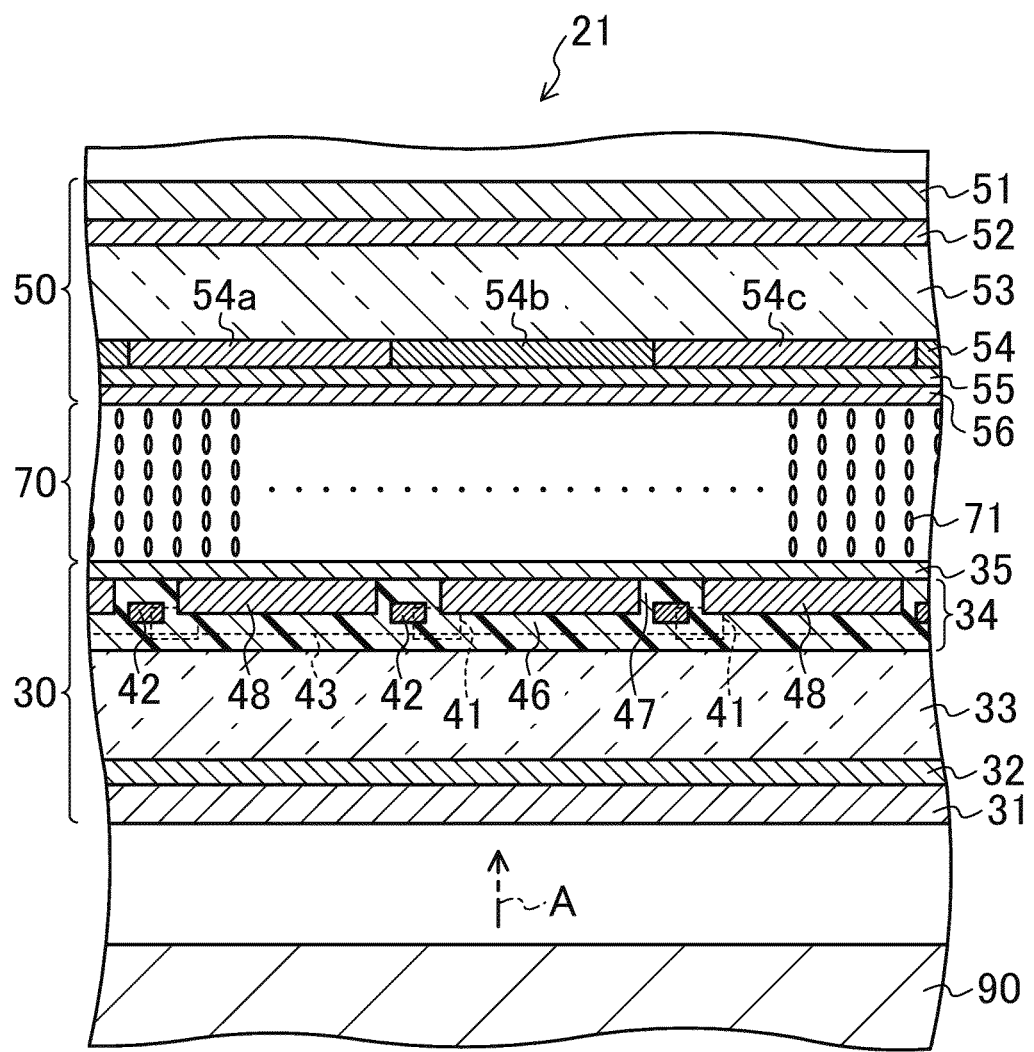
FIG. 3 is a schematic cross-sectional view illustrating a display region of the display panel.

FIGS. 2 and 3 illustrate the panel 2. The panel 2 is a normally black liquid crystal panel, and has the minimum light transmittance so that the screen is displayed in black when no voltage is applied. The panel 2 includes a TFT substrate 30 (a first substrate), an facing substrate 50 (a second substrate), a liquid crystal layer 70, phase plates 32 and 52, and polarizing plates 31 and 51.

The facing substrate 50 faces the TFT substrate 30 with a surface facing the display side, and is opposed to the TFT substrate 30. The outer edges of the substrates are sealed by a sealing member 10. The liquid crystal layer 70 is enclosed between the both substrates 50 and 30. A rectangular display region 21, which displays an image, is formed in the center of the panel 2 surrounded by the sealing member 10. In the rectangular display region 21, a plurality of rectangular pixels 22, 22, . . . , are arranged in a matrix.

As shown in FIG. 3, the display region 21 of the facing substrate 50 includes the second polarizing plate 51, the second phase plate 52, a second glass substrate 53, a color filter 54, a common electrode 55, and a second alignment film 56. The second polarizing plate 51 and the second phase plate 52, which are films, are formed on the display surface of the second glass substrate 53. The color filter 54, the common electrode 55, and the second alignment film 56 are stacked on the facing surface of the second glass substrate 53. These members 51-56 are formed in the entire surface of the display region 21.

The color filter 54 includes regions 54a, 54b, and 54c of three colors of red (R), green (G), and blue (B), which are arranged in predetermined positions to correspond to the pixels 22. The common electrode 55 is a transparent conductive film made of ITO etc., exhibiting excellent light transmittance. The second alignment film 56 is located in the outermost position to be in contact with the liquid crystal layer 70. The second alignment film 56 is subjected to predetermined alignment treatment for aligning liquid crystal molecules 71 included in the liquid crystal layer 70, which will be described later.

The display region 21 of the TFT substrate 30 includes the first polarizing plate 31, the first phase plate 32, a first glass substrate 33, a TFT layer 34, and a first alignment film 35. The first polarizing plate 31 and the first phase plate 32, which are films, are stacked on the non-display surface of the first glass substrate 33. The TFT layer 34 and the first alignment film 35 are stacked on the facing surface of the first glass substrate 33. These members 31-35 are also formed in the entire surface of the display region 21. Note that the first phase plate 32 and the second phase plate 52 are provided to improve viewing angle characteristics, and may be located collectively on the facing substrate 50 or the TFT substrate 30.

Figure 4:
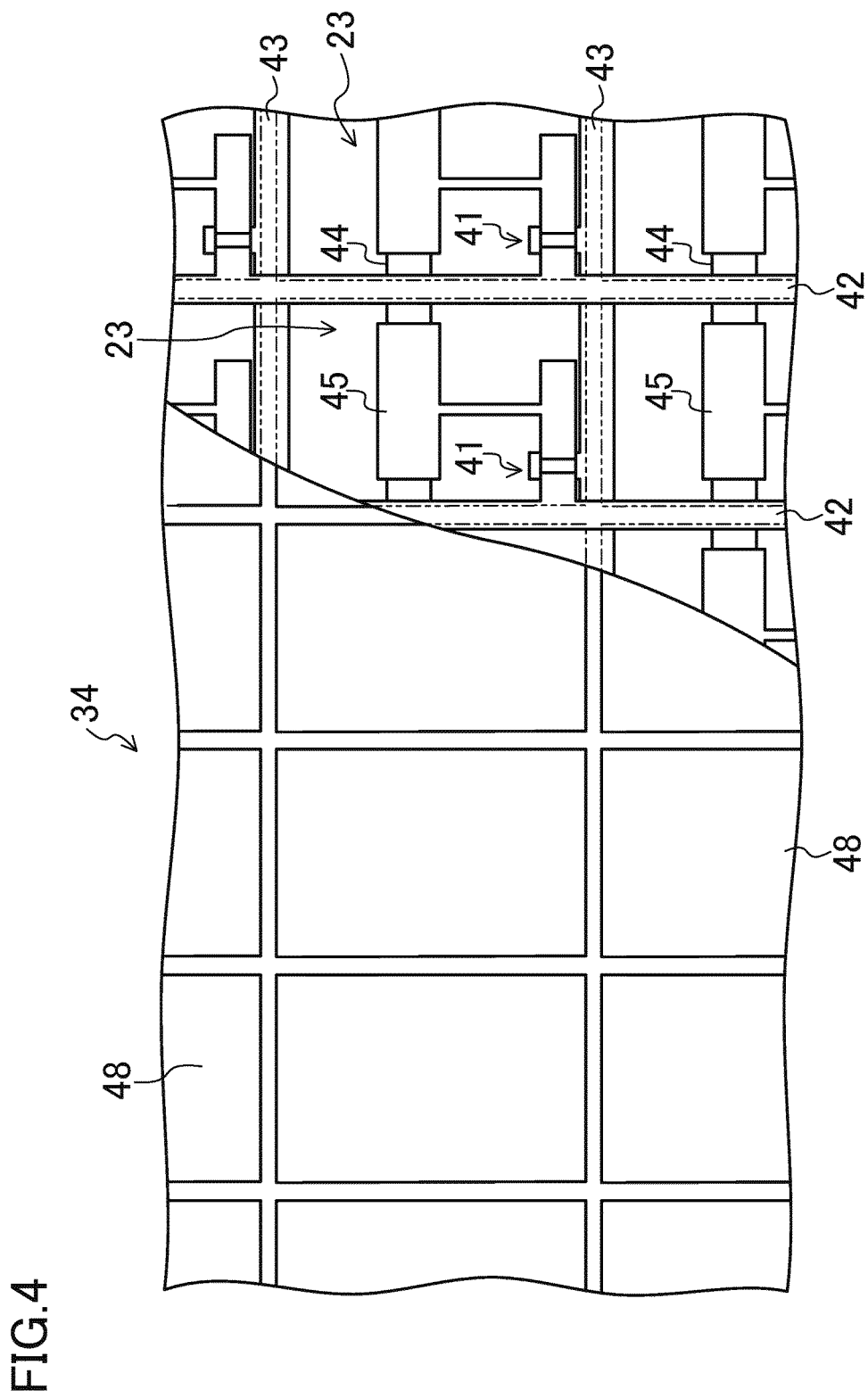
FIG. 4 is a schematic top view illustrating a main part of a TFT substrate.

FIG. 4 illustrates a part of the TFT layer 34 as viewed from its facing surface. As shown in the figure, thin film transistors 41 (TFTs), source lines 42, gate lines 43, auxiliary capacitor lines 44, capacitors 45, etc., which are patterned in predetermined forms, are stacked in the TFT layer 34.

Specifically, the plurality of source lines 42, 42, . . . , extending in parallel, and the plurality of gate lines 43, 43, . . . , extending orthogonal to the source lines 42, 42, . . . , are provided on the facing surface. The display region 21 is segmented in a grid by the source lines 42, 42, . . . , and the gate lines 43, 43, . . . . A plurality of pixel regions 23, 23, . . . , are formed to correspond to the pixels 22. An auxiliary capacitor line 44 is provided between each adjacent pair of the gate lines 43 and 43 in parallel to the gate lines 43. Each of the capacitors 45, which is coupled to the auxiliary capacitor line 44, is provided in the center of each pixel region 23. The capacitors 45 are coupled to the source lines 42 via the TFTs 41 having a switching function.

The TFTs 41 are provided near the intersections between the corresponding gate lines 43 and source lines 42, and are arranged in the respective pixel regions 23. The gate lines 43 are covered with a gate insulating film 46, on which semiconductor of the TFTs 41 and the source lines 42 are provided. Furthermore, the semiconductor etc. is covered with an insulating protection film 47, thereby forming the TFT layer 34. In the upper portion of the TFT layer 34, a plurality of rectangular pixel electrodes 48 are provided.

The pixel electrodes 48 are provided in the respective pixel regions 23, and arranged in a matrix on the entire surface of the display region 21. The pixel electrodes 48 are coupled to the source lines 42 via the TFTs 41. The pixel electrodes 48 are transparent conductive films made of ITO etc. having excellent light transmittance.

The first alignment film 35 is provided in the outermost position to cover the pixel electrodes 48 to be in contact with the liquid crystal layer 70. The first alignment film 35 is subjected to predetermined alignment treatment, which will be also described later.

A backlight 90, which is a light source, is provided at the side of the non-display surface of the TFT substrate 30. That is, the liquid crystal display device 1 according to this embodiment is a transmission type and performs display utilizing the light of the backlight 90. Specifically, a voltage applied between the common electrode 55 and the pixel electrodes 48 is controlled to change the alignment directions of the liquid crystal molecules 71 contained in the liquid crystal layer 70. Display is performed by changing the transmittance of the light of the backlight 90 passing through the TFT substrate 30 etc.

In the panel 2 of this embodiment, a black matrix (BM) for covering the regions with the source lines 42 and the gate lines 43 is not provided to increase the aperture ratio.

The liquid crystal layer 70 is made of a liquid crystal material having negative dielectric anisotropy. Specifically, the liquid crystal layer 70 contains the rod-shaped liquid crystal molecules 71. When no voltage is applied (i.e., in a non-voltage applied state), the liquid crystal molecules 71 are arranged vertically so that the long axes of the molecules substantially coincide with the direction orthogonal to the facing surfaces of the substrates (i.e., the direction indicated by a light transmission axis A). Then, when a voltage is applied (i.e., in a voltage applied state), the liquid crystal molecules 71 are arranged horizontally. That is, the liquid crystal display device 1 employs a (vertical alignment) VA mode.

Figure 5:
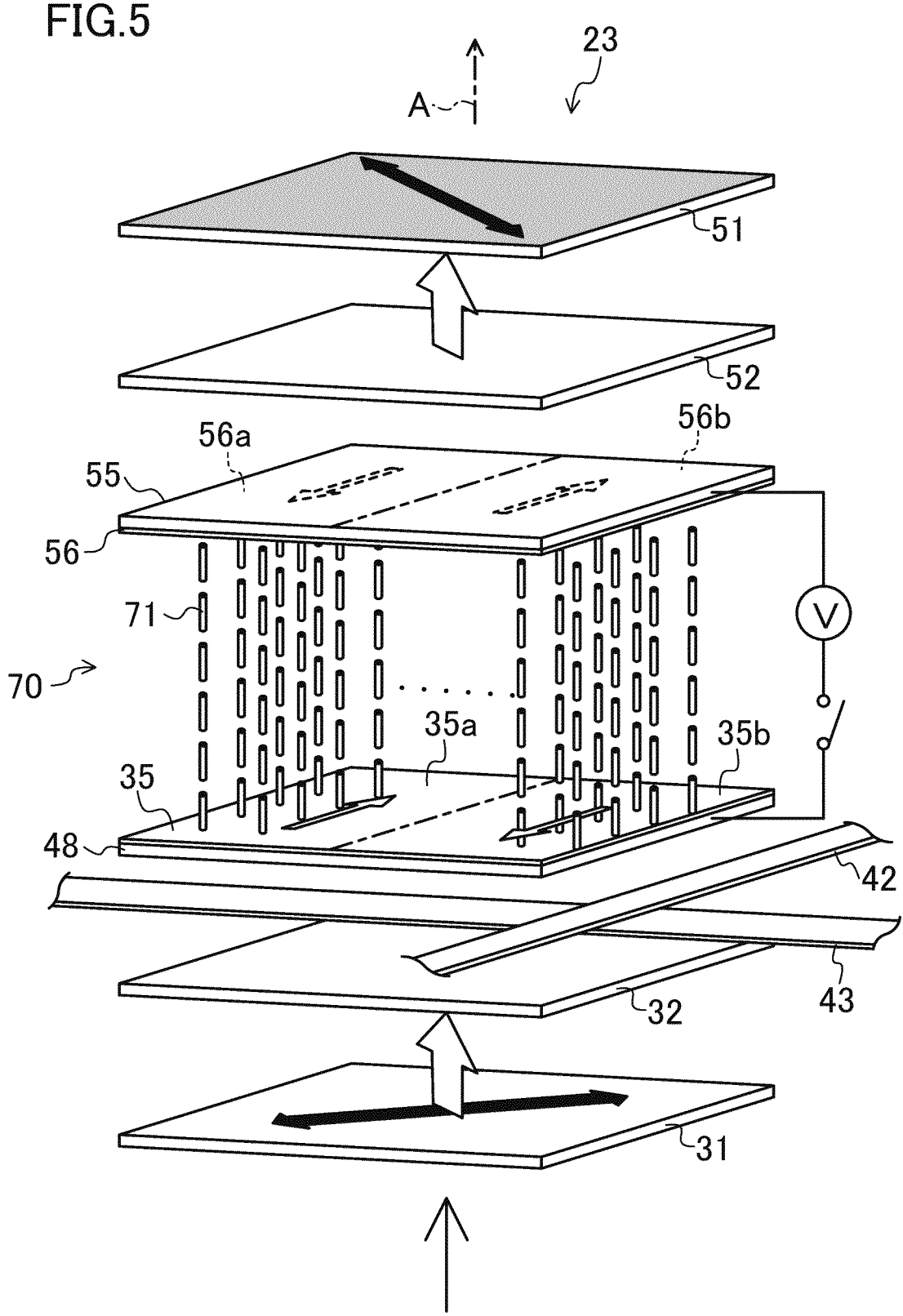
FIG. 5 is a conceptual view illustrating a pixel region when no voltage is applied.

FIG. 5 is a conceptual view illustrating a pixel region 23 in a non-voltage applied state. In the figure, light (randomly polarized light) of the backlight 90 is incident on the panel 2 from the direction indicated by the thin arrow below the first polarizing plate 31. The incident light passes through the first polarizing plate 31 first, thereby becoming linearly polarized light orthogonal to an absorption axis (indicated by the thick arrow). Then, the linearly polarized light passes through the first phase plate 32 and is incident on the liquid crystal layer 70.

At this time, since the liquid crystal molecules 71 are arranged along the light transmission axis A, the light is transmitted by the liquid crystal layer 70 without being influenced by birefringence, and passes through the second phase plate 52. Thus, the light does not change from the linearly polarized light orthogonal to the absorption axis of the first polarizing plate 31.

The absorption axis of the second polarizing plate 51 is provided to be orthogonal to the absorption axis of the first polarizing plate 31 (which is indicated by the thick arrow). Being parallel to the absorption axis of the second polarizing plate 51, the polarized light incident on the second polarizing plate 51 is absorbed by the second polarizing plate 51 and cannot be output. As a result, the pixel region 23 is displayed in black (i.e., dark)

Figure 6:
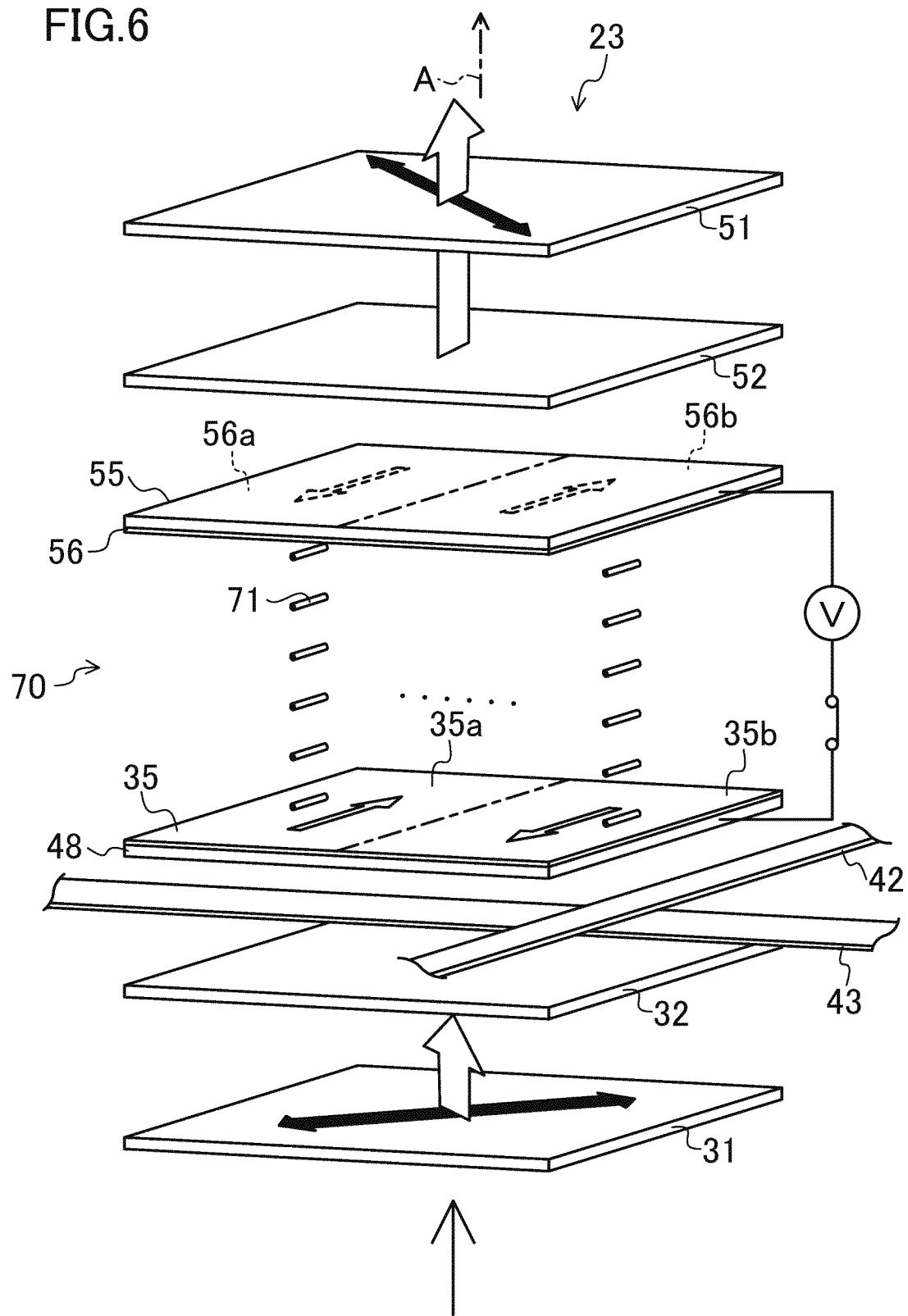
FIG. 6 is a conceptual view illustrating a pixel region when a voltage is applied.

FIG. 6 is a conceptual view illustrating a pixel region 23 in a voltage applied state. At this time, the liquid crystal molecules 71 are aligned in the horizontal direction so that their long axes are orthogonal to the light transmission axis A. The polarized light having passed through the first phase plate 32 passes through the liquid crystal layer 70 under the influence of the birefringence, and passes through the second phase plate 52, thereby becoming linearly polarized light orthogonal to the absorption axis of the second polarizing plate 51. Since the linearly polarized light is output without being absorbed by the second polarizing plate 51, the pixel region 23 is displayed in white (i.e., bright).

Alignment Treatment

The surfaces of the first alignment film 35 and the second alignment film 56 are subjected to alignment treatment so that the liquid crystal molecules 71 are aligned in a predetermined direction. In particular, in the panel 2, alignment division is performed to divide directions of alignment treatment into two in each of the pixel regions 23 in order to improve viewing angle characteristics, while improving the light transmittance of the pixel regions 23.

Specifically, as indicated by the directional lines in FIGS. 5 and 6, in this embodiment, in each of the first alignment film 35 and the second alignment film 56, each of the pixel regions 23 are divided into two along the direction parallel to the source lines 42. The obtained two regions have different directions of alignment treatment. Specifically, the first alignment film 35 includes a first region 35a and a second region 35b, which are subjected to alignment treatment in the direction parallel to the source lines 42, and have opposite (anti-parallel) directions of alignment treatment. The second alignment film 56 includes a third regions 56a and a fourth region 56b, which are subjected to alignment treatment in the direction parallel to the source lines 42 and have opposite directions of alignment treatment.

The first region 35a faces the third regions 56a, and the second region 35b faces the fourth region 56b. The first region 35a and the third regions 56a have opposite direction of alignment treatments, and the second region 35b and the fourth region 56b have opposite directions of alignment treatment. The liquid crystal display device 1 controls light transmittance by utilizing the birefringence of liquid crystal, as described above, and thus, as viewed from the light transmission axis A, the first polarizing plate 31 is provided so that its absorption axis direction is substantially shifted from the direction of alignment treatment of the first alignment film 35 by a degree of 45°. The second polarizing plate 51 is provided so that its absorption axis direction is substantially shifted from the direction of alignment treatment of the second alignment film 56 by a degree of 45°. That is, the second polarizing plate 51 is provided so that its absorption axis direction is orthogonal to the absorption axis direction of the first polarizing plate 31.

By providing two regions having different directions of alignment treatment in a single pixel region 23, the views of the liquid crystal molecules 71 from different angles are averaged, and thus the viewing angle is expanded. In particular, in this embodiment, two regions have opposite directions of alignment treatment, thereby effectively expand the viewing angle.

The alignment treatment may be performed by, for example, conventional rubbing, oblique vapor deposition utilizing a silicon oxide vapor deposited film, and a light alignment film method. The alignment treatment of this embodiment is, in particular, preferably performed by the light alignment film method with UV irradiation using a mask. Since the liquid crystal display device 1 employs the VA mode, a vertical alignment film having a pretilt angle θ ranging from 86° to 89.5°.

Figure 7:
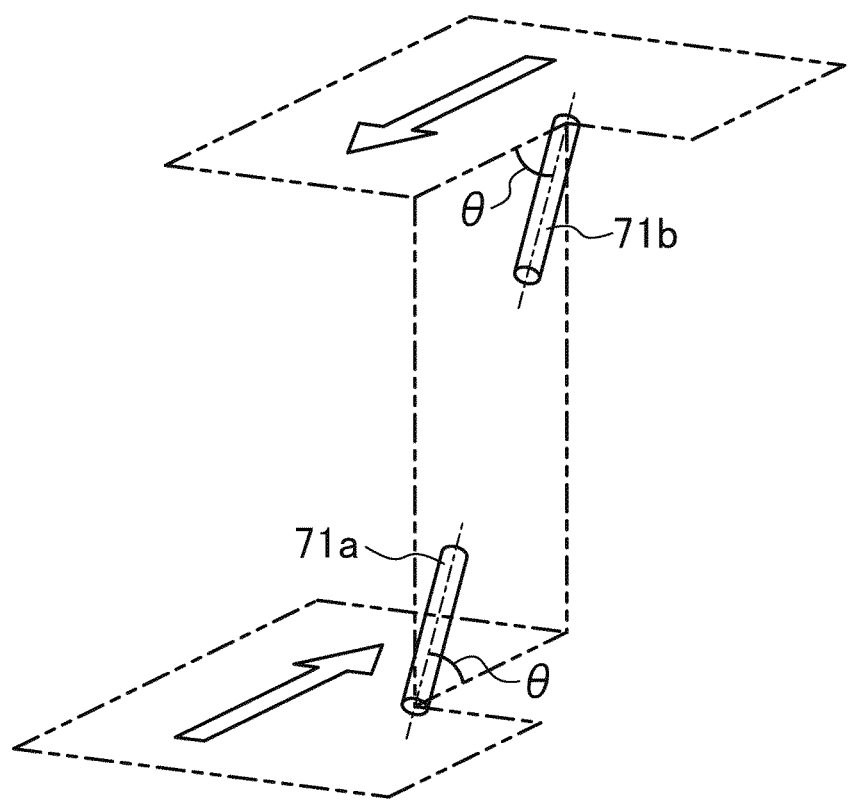
FIG. 7 illustrates alignment treatment.

FIG. 7 illustrates the relationship. The arrows in the figures denote directions of alignment treatment indicating, for example, rubbing directions in rubbing. Since two facing regions have opposite directions of alignment treatment, a liquid crystal molecule 71a near the first alignment film 35 and a liquid crystal molecule 71b near the second alignment film 56 are aligned in the same direction. As such, the liquid crystal molecules 71 near the alignment films are inclined slightly in advance, thereby stably aligning the liquid crystal molecules 71 in a predetermined direction. In addition, since the liquid crystal molecules 71 tend to be inclined, thereby increasing response speed.

Figure 8:
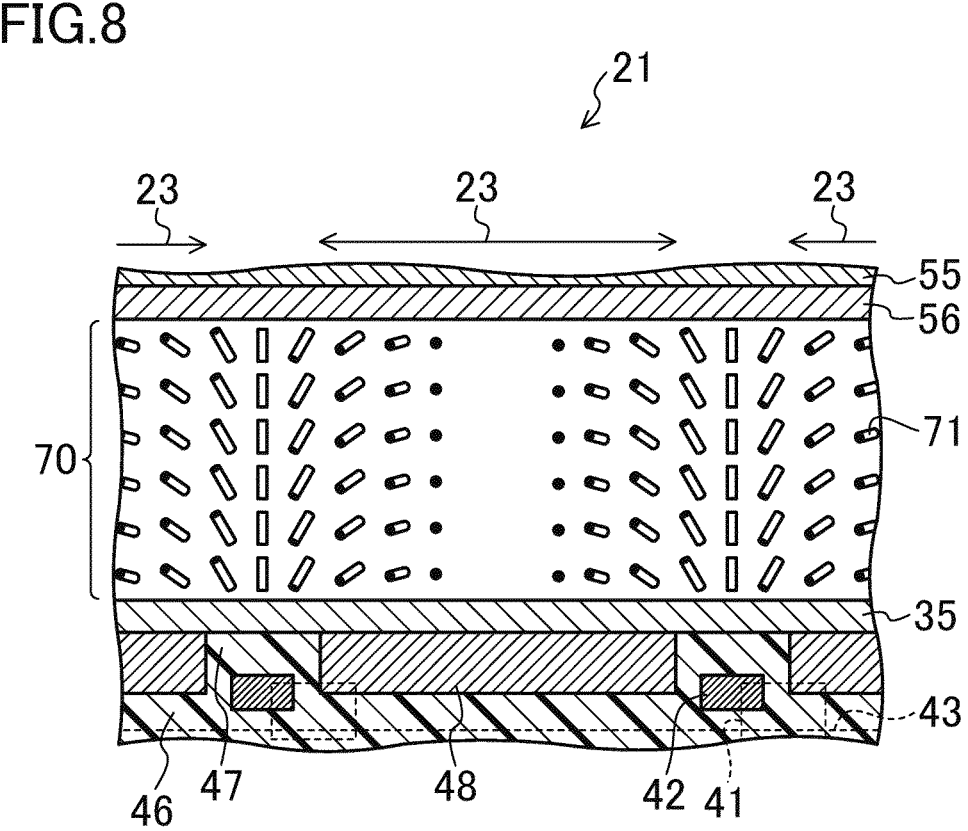
FIG. 8 illustrates misalignment of liquid crystal when a voltage is applied.

In alignment division in a VA mode, misalignment of the liquid crystal molecules 71 tends to increase to reduce the light transmittance. FIG. 8 illustrates a cross-section of the display region 21 in a voltage-applied state. As shown in the figure, the liquid crystal molecules 71 are aligned in the horizontal direction in the pixel regions 23, in which the common electrode 55 faces the pixel electrodes 48, under the influence of a voltage. Above the source lines 42 and the gate lines 43 without pixel electrodes 48, there is no influence of a voltage, and thus, the liquid crystal molecules 71 are not aligned horizontally. At the boundaries between the source lines 42 and the corresponding pixel regions 23, the alignment directions of the liquid crystal molecules 71 tend to be three-dimensionally greatly disordered.

At the boundary between the regions having different alignment directions, the alignment directions of the liquid crystal molecules 71 tend to be two-dimensionally greatly disordered. The light transmitted by the portion with disordered alignment directions of the liquid crystal molecules 71 tends to be absorbed by the second polarizing plate 51, thereby reducing light transmittance to cause dark display.

The viewing angle characteristics are improved by increasing the number of alignment division, but the light transmittance decreases. Thus, in order to obtain good balance of the advantages of improving the viewing angle characteristics, and reducing the light transmittance under the condition of a small and fine pixel size, the alignment division is preferably the division into two.

Figure 9:
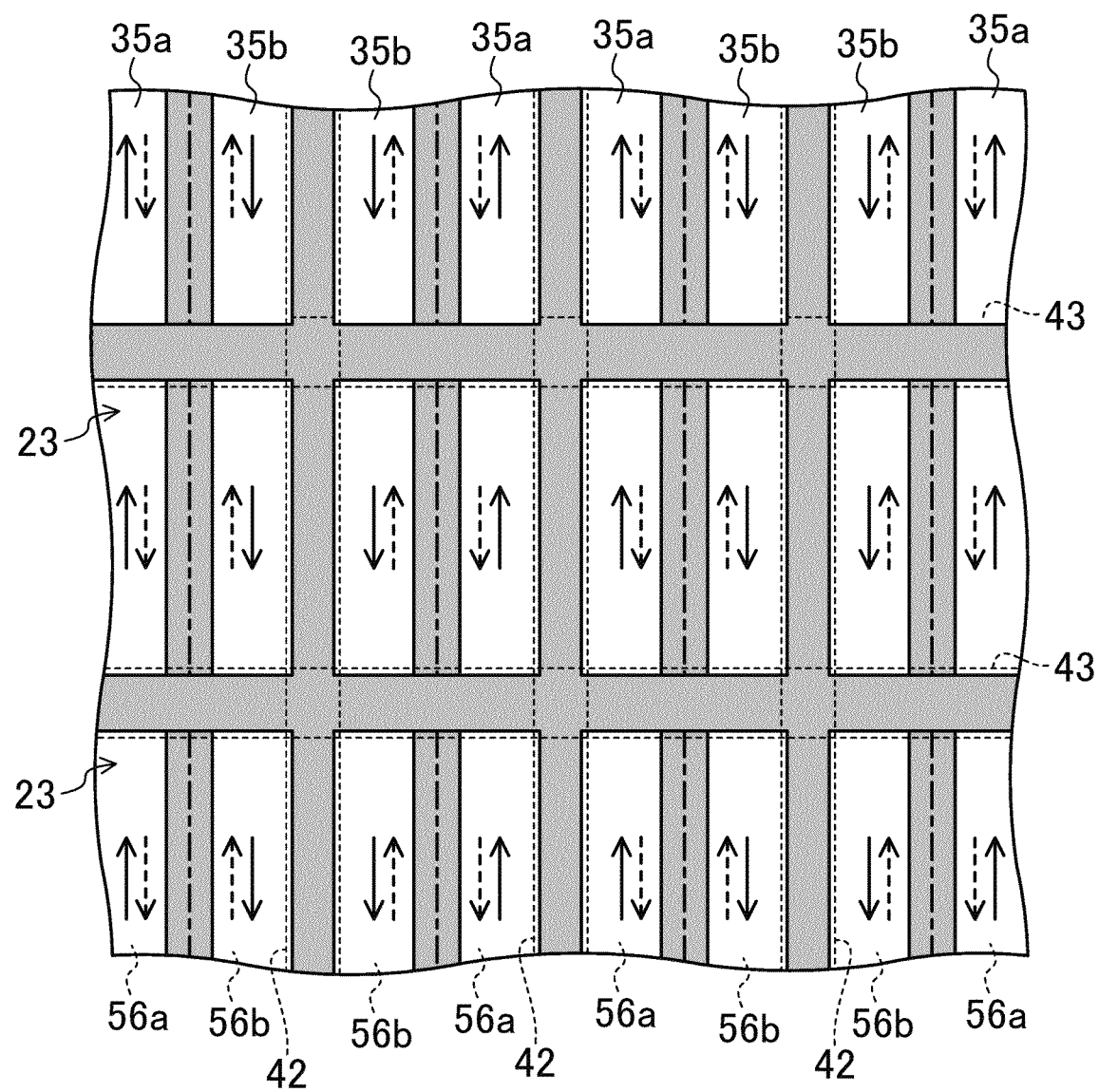
FIG. 9 is a conceptual view illustrating the brightness of the display region when a voltage is applied.

In this case, with respect to the alignment direction, as shown in FIG. 9, the adjacent pixel regions 23 are preferably arranged so that the regions adjacent to each other with the corresponding one of the source lines 42 interposed therebetween have the same alignment direction.

Specifically, the first regions 35a and 35a of the adjacent pair of the pixel regions 23 are arranged to be adjacent to each other with corresponding one of the source lines 42 interposed therebetween. Similarly, the second regions 35b and 35b, the third regions 56a and 56a, the fourth regions 56b and 56b are arranged to be adjacent to each other with corresponding one of the source lines 42 interposed therebetween.

The directional lines in the figure indicate the directions of alignment treatment. The solid lines indicate the directions of alignment treatment of the first alignment film 35, and the broken lines indicate the directions of alignment treatment of the second alignment film 56.

As a result, the liquid crystal molecules 71 above the source lines 42 are aligned similarly to cause less misalignment under the influence of the regions on the both sides having the same alignment direction, thereby mitigating reduction in the light transmittance occurring at the boundaries between the source lines 42 and the corresponding pixel regions 23, and improving the brightness of the pixel regions 23.

Figure 10:
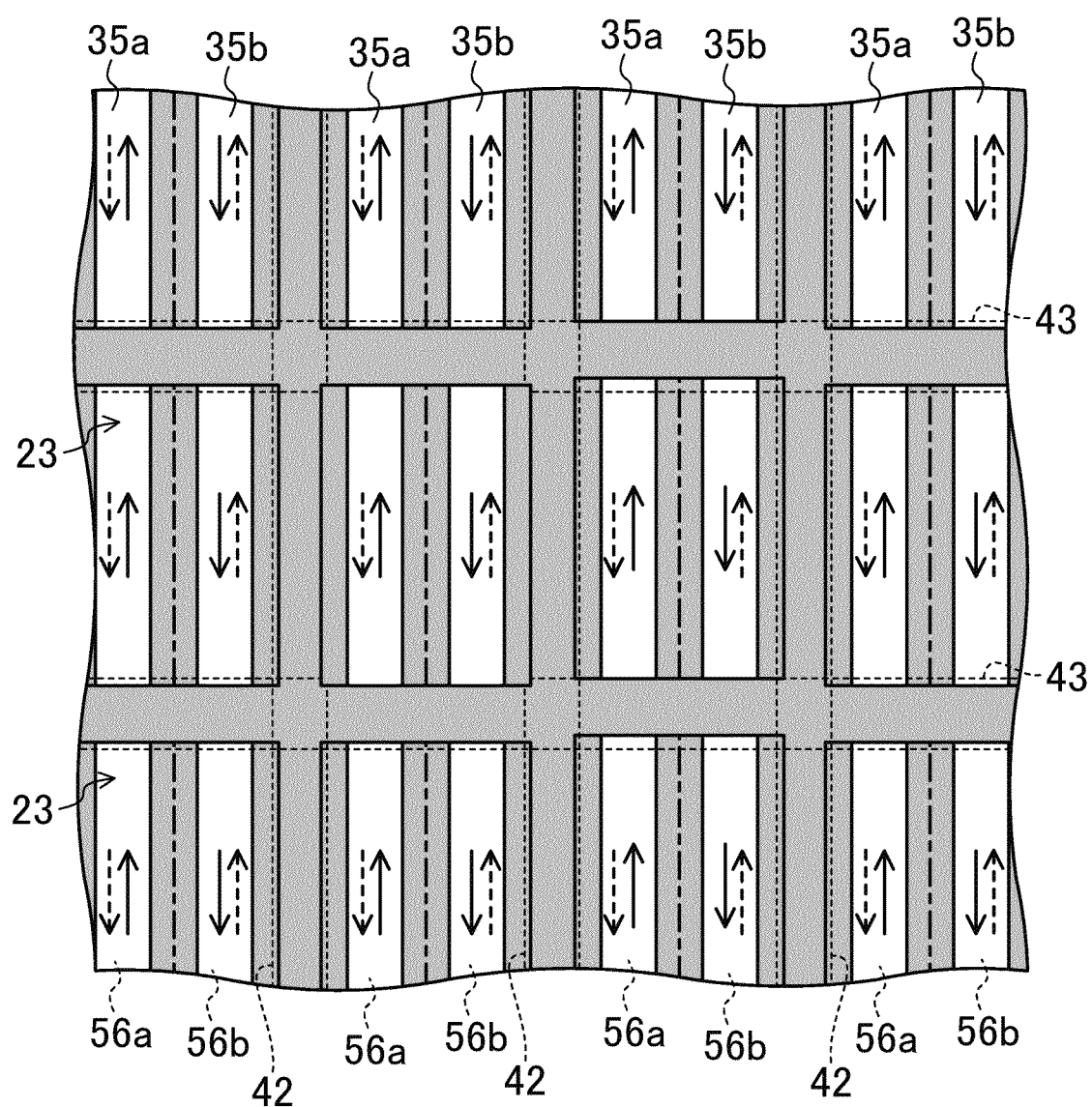
FIG. 10 is a conceptual view illustrating the brightness of a display region according to a comparison example when a voltage is applied.

Assume that the adjacent pixel regions 23 are arranged so that the regions adjacent to each other with the corresponding one of the source lines 42 interposed therebetween have opposite alignment directions. As shown in FIG. 10, the liquid crystal molecules 71 above the source lines 42 and at the boundaries between the source lines 42 and the corresponding pixel regions 23 are greatly misaligned, thereby causing dark display. Such dark displayed regions are hidden where a BM is provided, but are displayed without change where no BM is provided. Thus, the substantial advantage of increasing the aperture ratio is not provided even without BM.

In this respect, the panel 2 of this embodiment effectively provides excellent viewing angle characteristics and the advantage of increasing the aperture ratio, since the misalignment of the liquid crystal molecules 71 is reduced at the boundaries of the source lines 42 by appropriately combining alignment division.

Variation of Alignment Treatment

FIGS. 11(a)-11(e) illustrate a variation of alignment treatment according to this embodiment. In these figures, the directional lines (the solid lines) indicate the directions of alignment treatment of the first alignment film 35, and the directional lines (the broken lines) indicate the directions of alignment treatment of the second alignment film 56.

In short, the adjacent pixel regions 23 may be arranged so that the regions adjacent to each other with the corresponding one of the source lines 42 interposed therebetween have the same direction of alignment treatment. For example, as shown in FIG. 11(a), the pairs of the first regions 35a and the second regions 35b, and the pairs of the third regions 56a and the fourth regions 56b may be subjected to alignment treatment in the direction orthogonal to the source lines 42, and the pairs of the regions may have opposite directions of alignment treatment.

As shown in FIGS. 11(b) and 11(c), the pairs of the first regions 35a and the second regions 35b, and the pairs of the third regions 56a and the fourth regions 56b may be subjected to alignment treatment in the direction inclined from the source lines 42 by an angle of 45° to be parallel to each other, and the pairs of the regions may have opposite directions of alignment treatment.

As shown in FIGS. 11(d) and 11(e), the pairs of the first regions 35a and the second regions 35b, and the pairs of the third regions 56a and the fourth regions 56b may be subjected to alignment treatment in the direction inclined from the source lines 42 by an angle of 45° to intersect with each other, and the pairs of the regions may have the same direction of alignment treatment (in the direction in which the pairs of the regions are close to or apart from each other. In this case, the pairs of the regions may have opposite directions of alignment treatment (i.e., one of the regions may be close to the other and the other may be apart from the one).

Variation of Liquid Crystal Display Device 1

Figure 12:
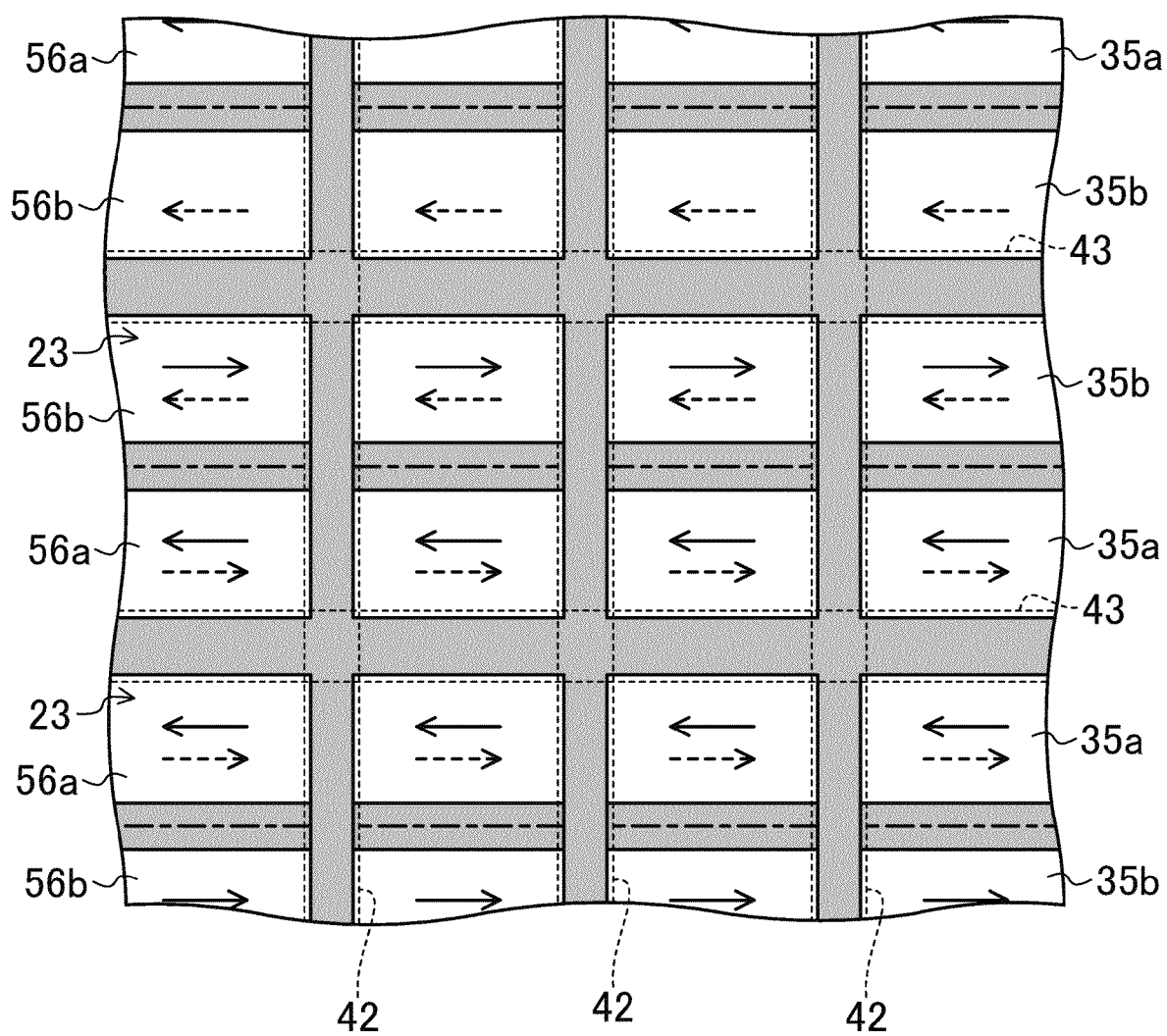
FIG. 12 illustrates a variation of the liquid crystal display device and corresponds to FIG. 9.
Figure 13:
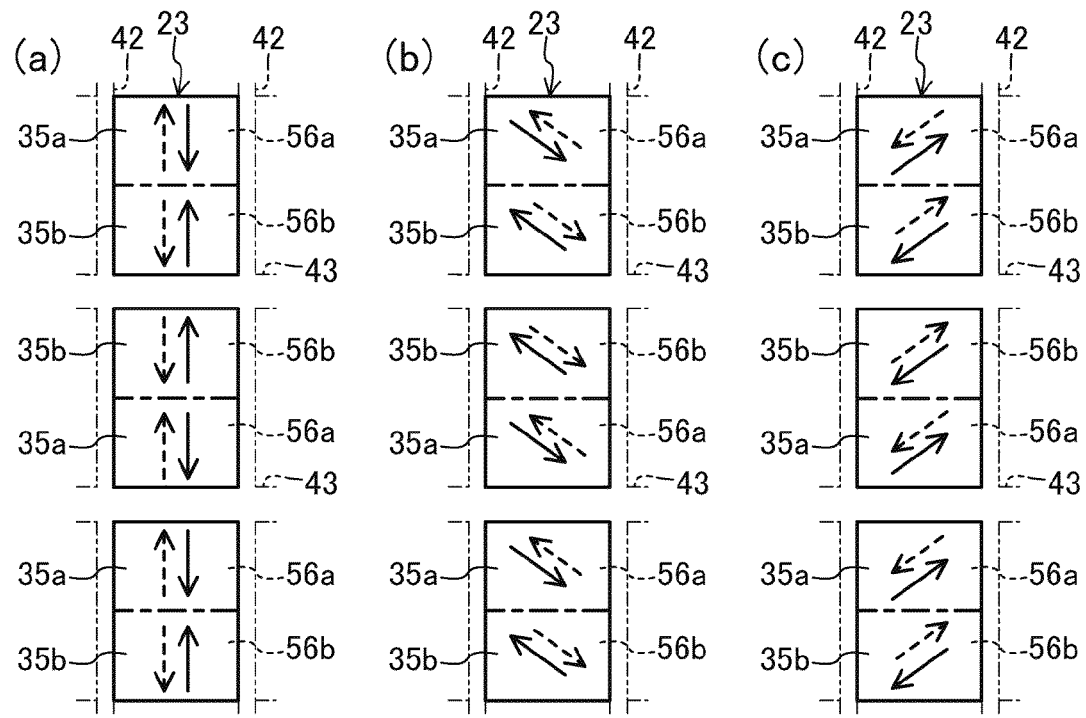
FIG. 13(a)-13(g) are schematic views illustrating alignment treatment according to a variation in the liquid crystal display device according to the variation.
Figure 13:
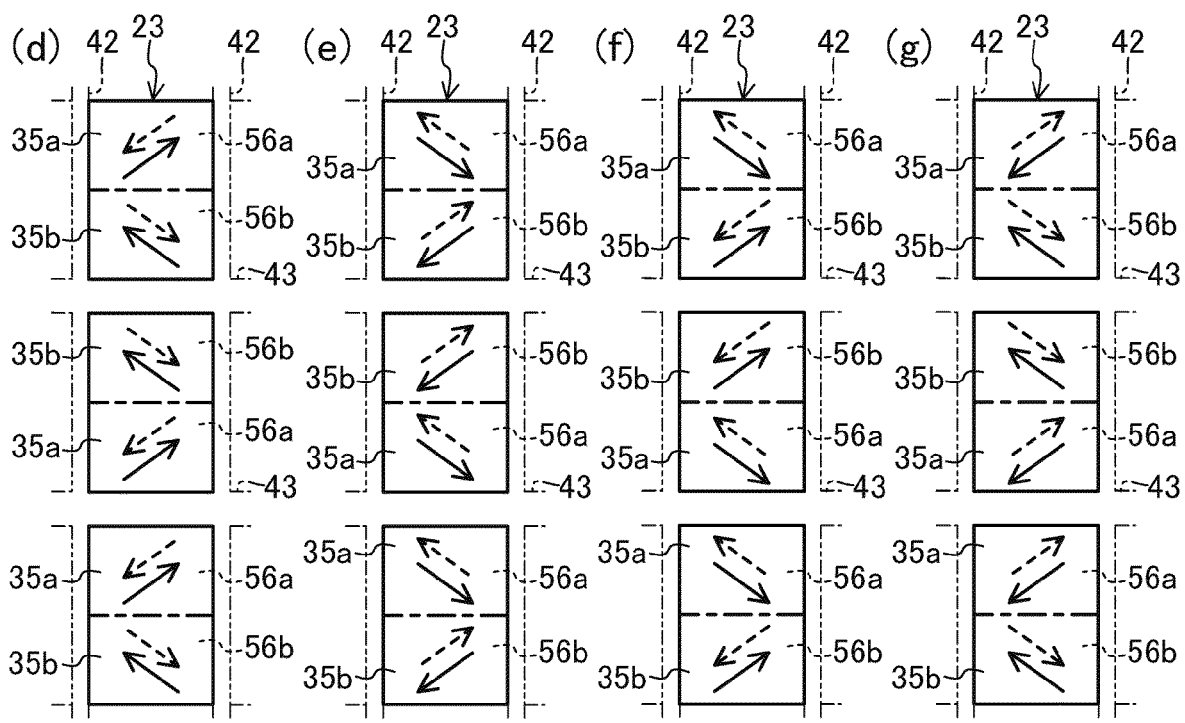

FIG. 12 illustrates a variation of the liquid crystal display device 1 according to this embodiment. This variation differs from the above-described embodiment in that alignment division is performed along the direction parallel to the gate lines 43. In this case, as shown in the figure, the reduction in the light transmittance occurring at the boundaries between the gate lines 43 and the corresponding pixel regions 23 is mitigated, and the brightness of the pixel regions 23 are improved.

In this variation, the adjacent pixel regions 23 may be arranged so that the regions adjacent to each other with the corresponding one of the gate lines 43 interposed therebetween have the same direction of alignment treatment. Similar to FIG. 11, FIGS. 13(a)-13(g) illustrate example directions of alignment treatment.

Second Embodiment

Figure 14:
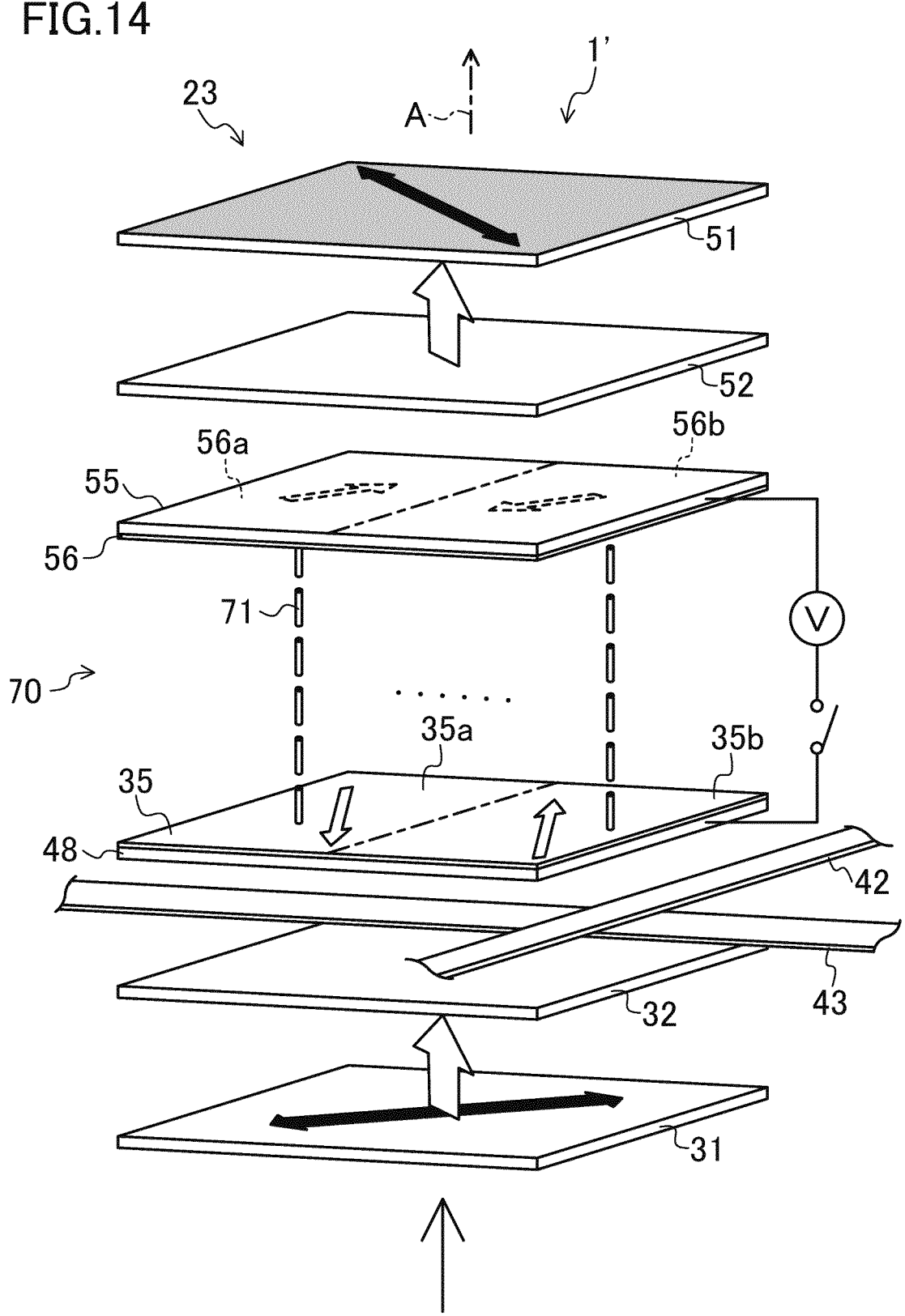
FIG. 14 illustrates a liquid crystal display device according to a second embodiment. This figure shows a pixel region when no voltage is applied.
Figure 15:
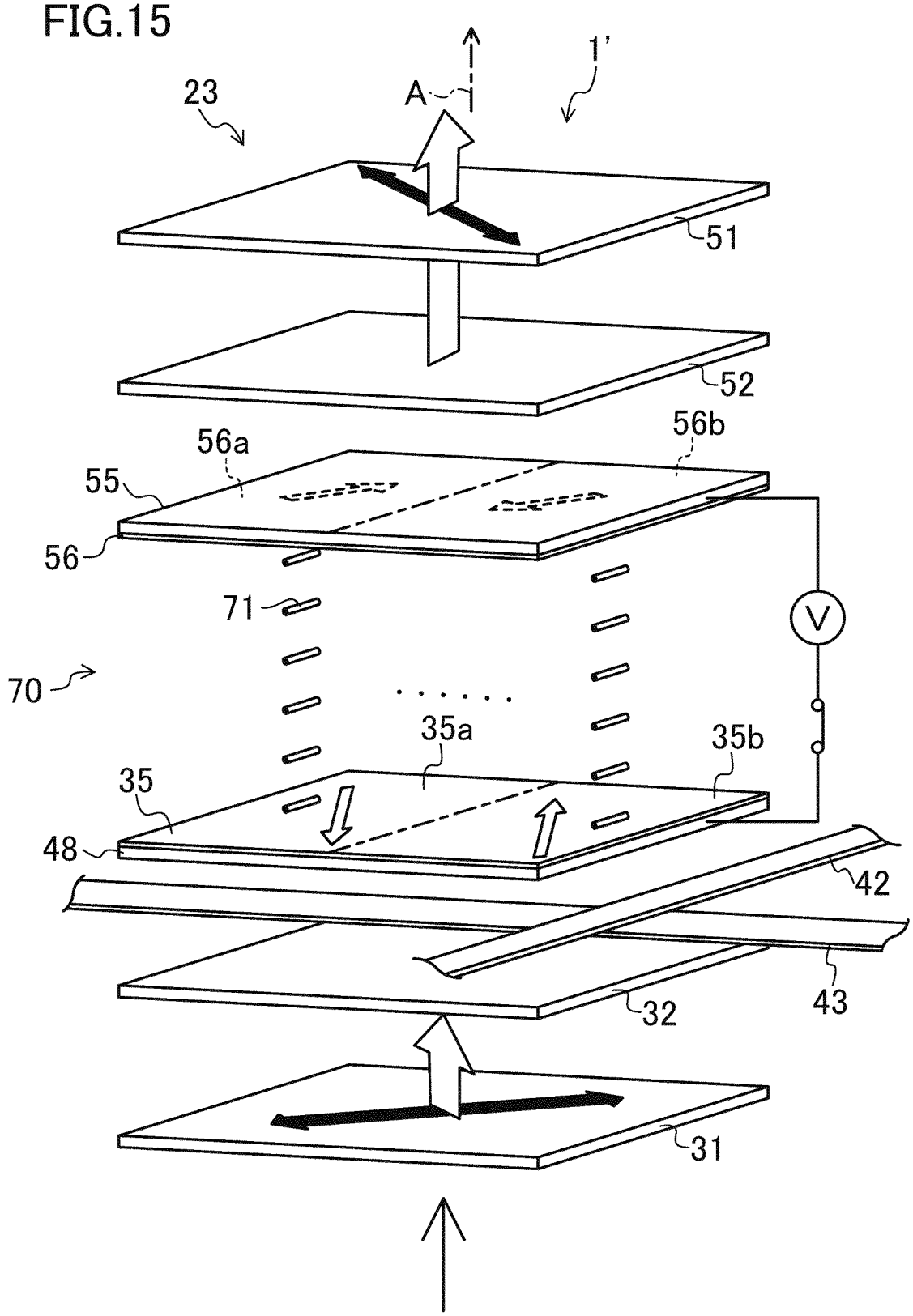
FIG. 15 illustrates the liquid crystal display device according to the second embodiment. This figure shows the pixel region when a voltage is applied.

FIGS. 14 and 15 illustrate a liquid crystal display device 1' according to this embodiment. The liquid crystal display device 1' according to this embodiment mainly differs from the liquid crystal display device 1 of the first embodiment in that a first alignment film 35 and a second alignment film 56 are arranged to have orthogonal directions of alignment treatment. The other main elements are the same as those in the above-described embodiment. (The same reference characters are used to represent equivalent elements, and the explanation thereof will be omitted.)

Specifically, pairs of regions of the first alignment film 35 and the second alignment film 56 are subjected to alignment treatment in the direction inclined from source lines 42 by 45° as viewed from a light transmission axis A to be parallel to each other. A first region 35a and a second region 35b are subjected to alignment treatment in opposite directions, and a third region 56a and a fourth region 56b are subjected to alignment treatment in opposite directions. The first region 35a and the third region 56a are subjected to alignment treatment in the orthogonal directions toward one of the source lines 42. The second region 35b and the fourth region 56b are subjected to alignment treatment in the orthogonal directions toward one of the source lines 42.

As viewed from the light transmission axis A, a first polarizing plate 31 is provided so that the direction of alignment treatment of the second alignment film 56 coincides with the absorption axis direction. The second polarizing plate 51 is provided so that the direction of alignment treatment of the first alignment film 35 coincides with the absorption axis direction. Note that the first polarizing plate 31 may be provided so that the direction of alignment treatment of the first alignment film 35 coincides with the absorption axis direction, and the second polarizing plate 51 may be provided so that the direction of alignment treatment of the second alignment film 56 coincides with the absorption axis direction.

As shown in FIG. 14, in this embodiment as well, liquid crystal molecules 71 are arranged vertically in a non-voltage applied state, and thus, the process of transmission of light to a pixel region 23 is the same as that in the first embodiment.

By contrast, as shown in FIG. 15, in a voltage-applied state, facing regions of the first alignment film 35 and the second alignment film 56 have orthogonal directions of alignment treatment. The liquid crystal molecules 71 form skew alignment only at the interface of the first alignment film 35 and at the interface of the second alignment film 56 (in a TN mode). In the center of the liquid crystal layer 70, the liquid crystal molecules 71 are aligned in the horizontal direction so that their long axes are orthogonal to the light transmission axis A. Then, the linearly polarized light having passed through the first phase plate 32 passes through the liquid crystal layer 70 under the influence of the birefringence. As a result, the linearly polarized light output from the second phase plate 52 is orthogonal to the absorption axis of the second polarizing plate 51.

Figure 16:
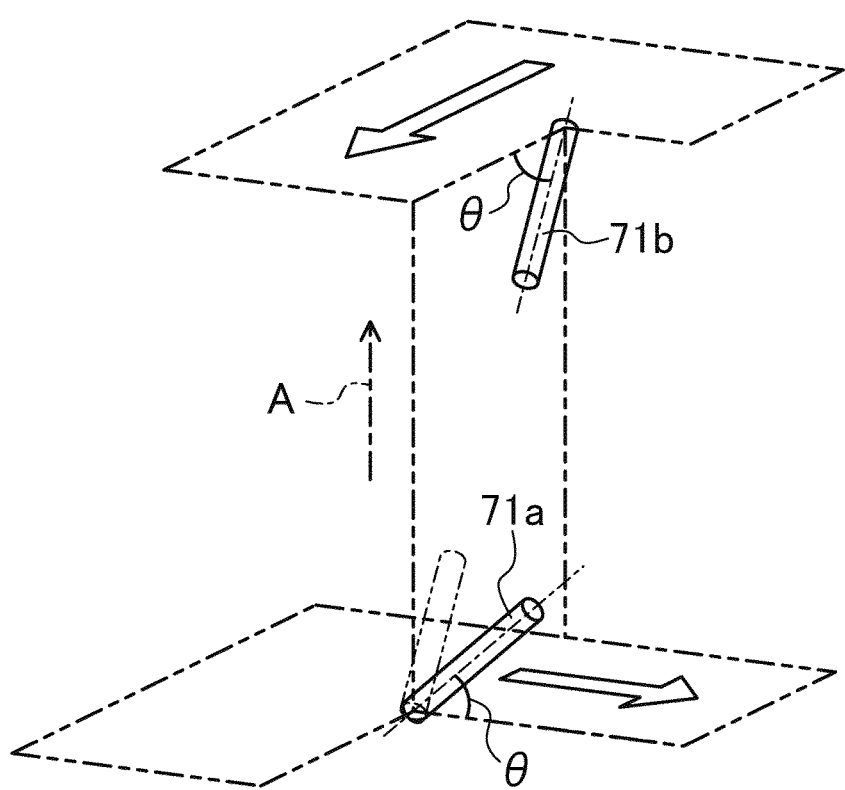
FIG. 16 illustrates alignment treatment according to the second embodiment.

In this case, as shown in FIG. 16, since two facing regions of the first alignment film 35 and the second alignment film 56 have orthogonal directions of alignment treatment, a liquid crystal molecule 71a near the first alignment film 35 is aligned in the direction shifted from the liquid crystal molecules 71b near the second alignment film 56 by a degree of 90° more than in the first embodiment as viewed from the light transmission axis A.

Similar to the first embodiment, in this embodiment, alignment division may be performed by dividing each of the pixel regions 23 in the first alignment film 35 and the second alignment film 56 into two along the direction parallel to either one of the source lines 42 or the gate lines 43. The adjacent pixel regions 23 may be provided so that the regions adjacent to each other with the corresponding one of the gate lines 43, etc., interposed therebetween have the same alignment direction. As a result, similar to the first embodiment, excellent viewing angle characteristics and the advantage of improving the aperture ratio can be provided.

Figure 11:
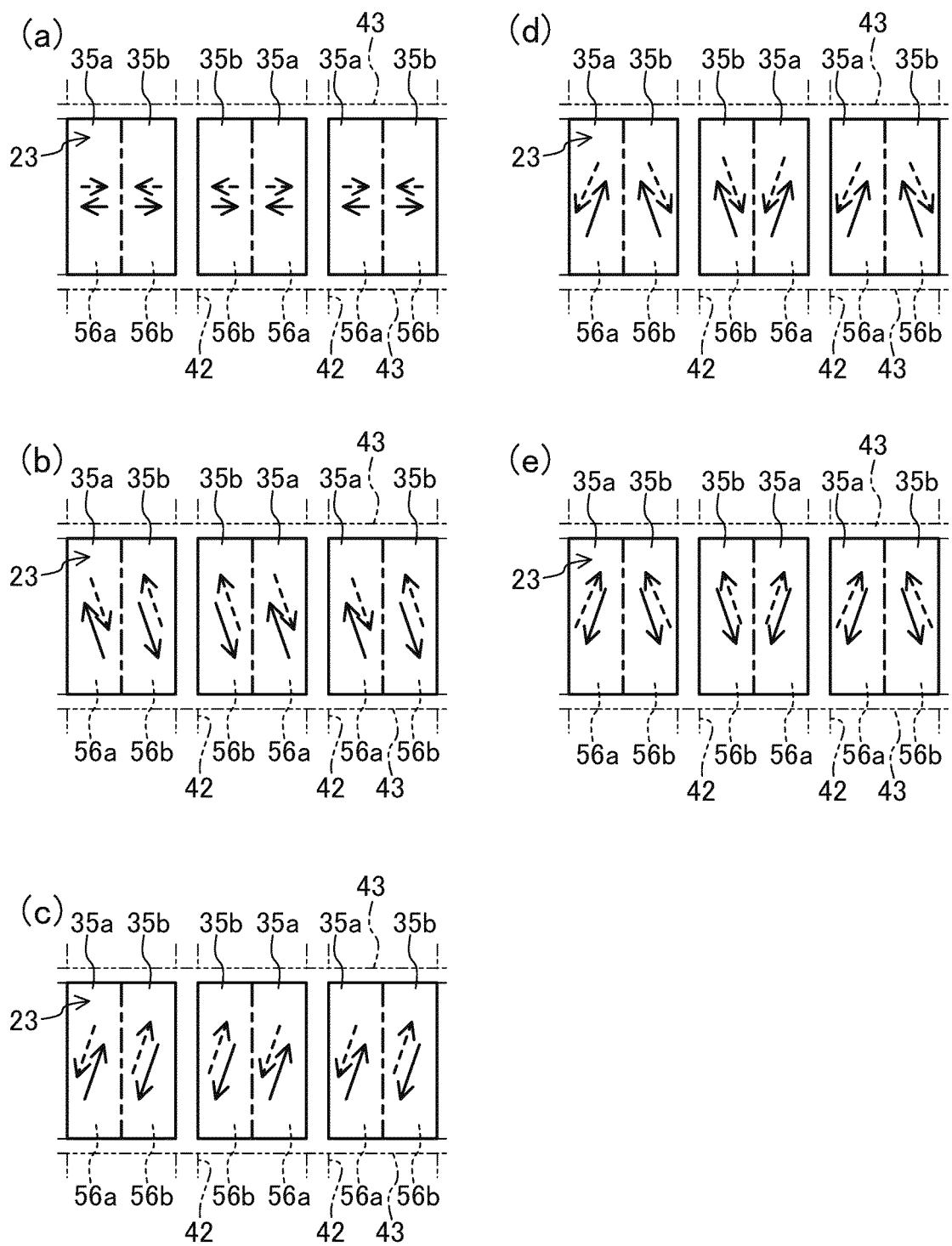
FIG. 11(a)-11(e) are schematic views illustrating a variation of alignment treatment.
Figure 17:
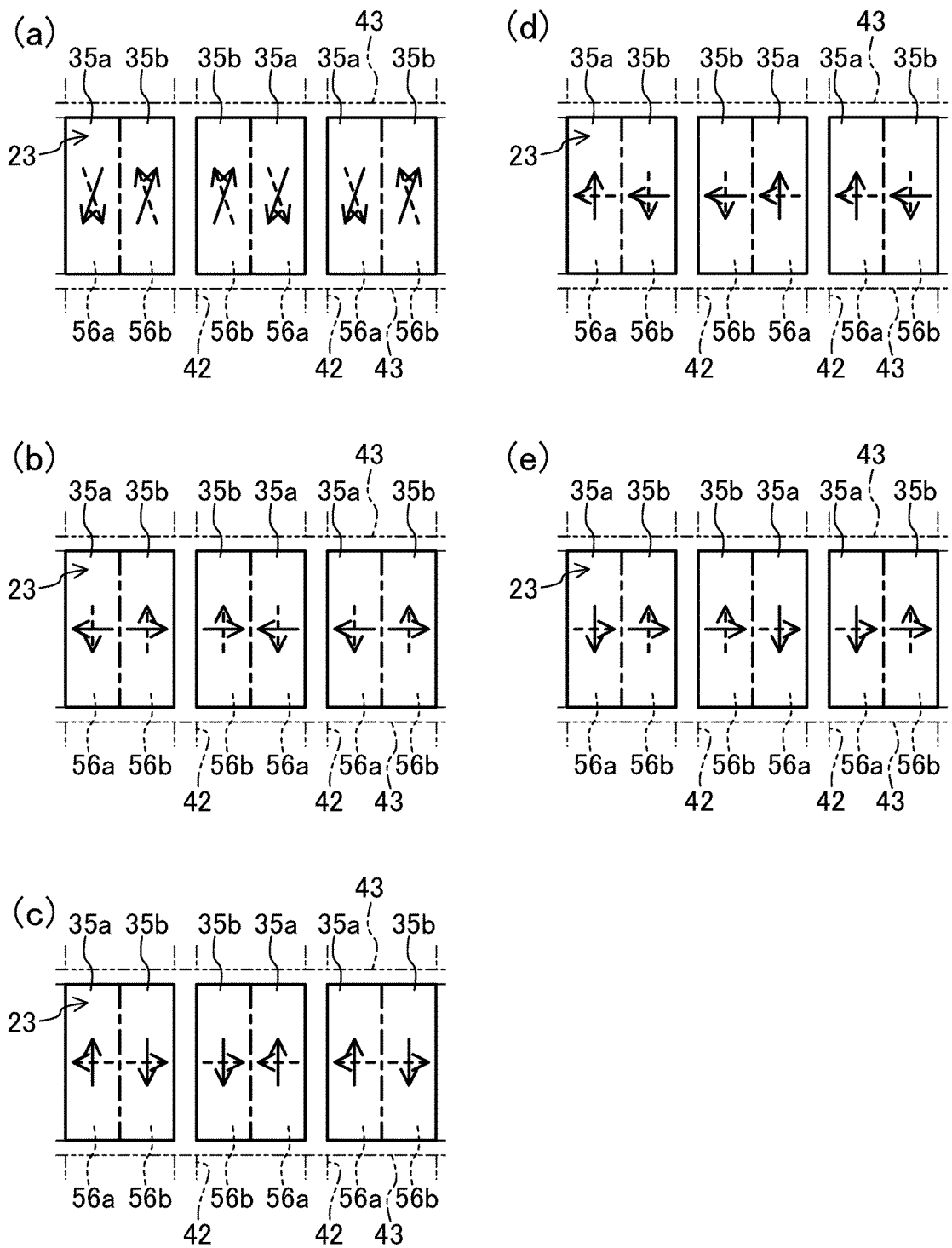
FIG. 17(a)-17(e) are schematic views illustrating alignment treatment according to a variation of the second embodiment.
Figure 18:
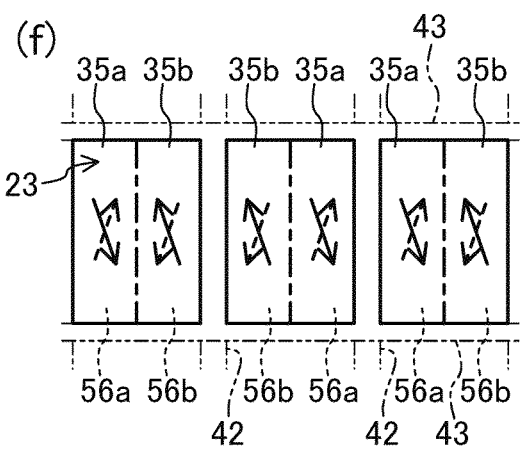
FIG. 18(f)-18(j) are schematic views illustrating the alignment treatment according to the variation of the second embodiment following FIG. 17.
Figure 18:
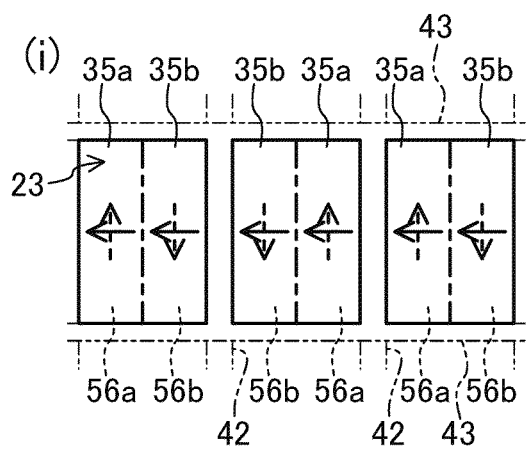
Figure 18:
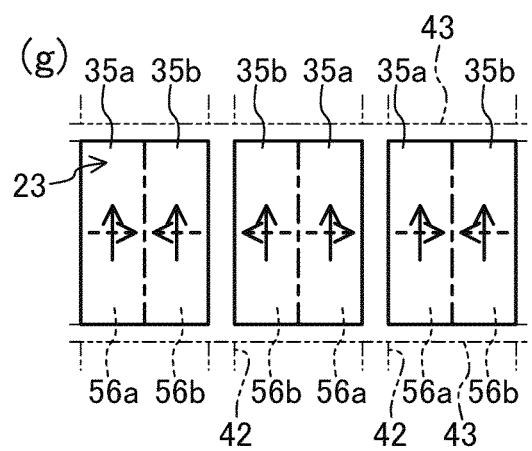
Figure 18:
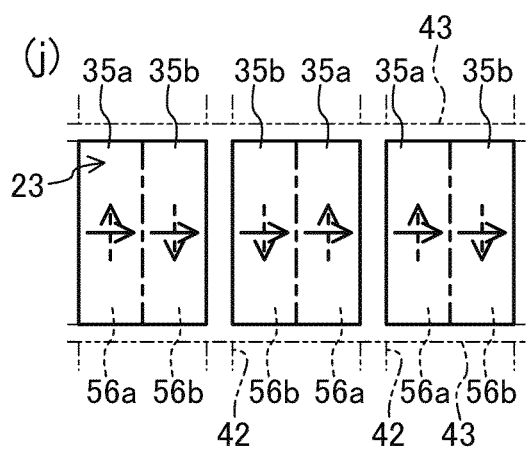
Figure 18:
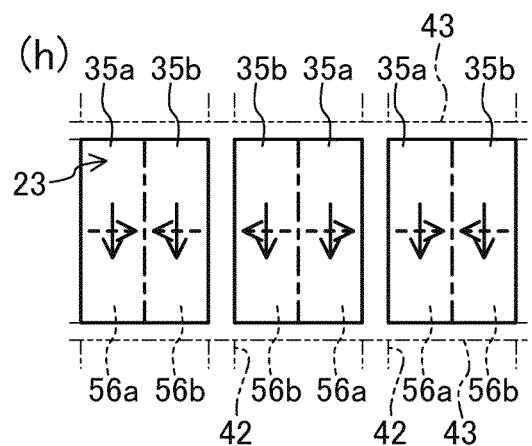
Figure 19:
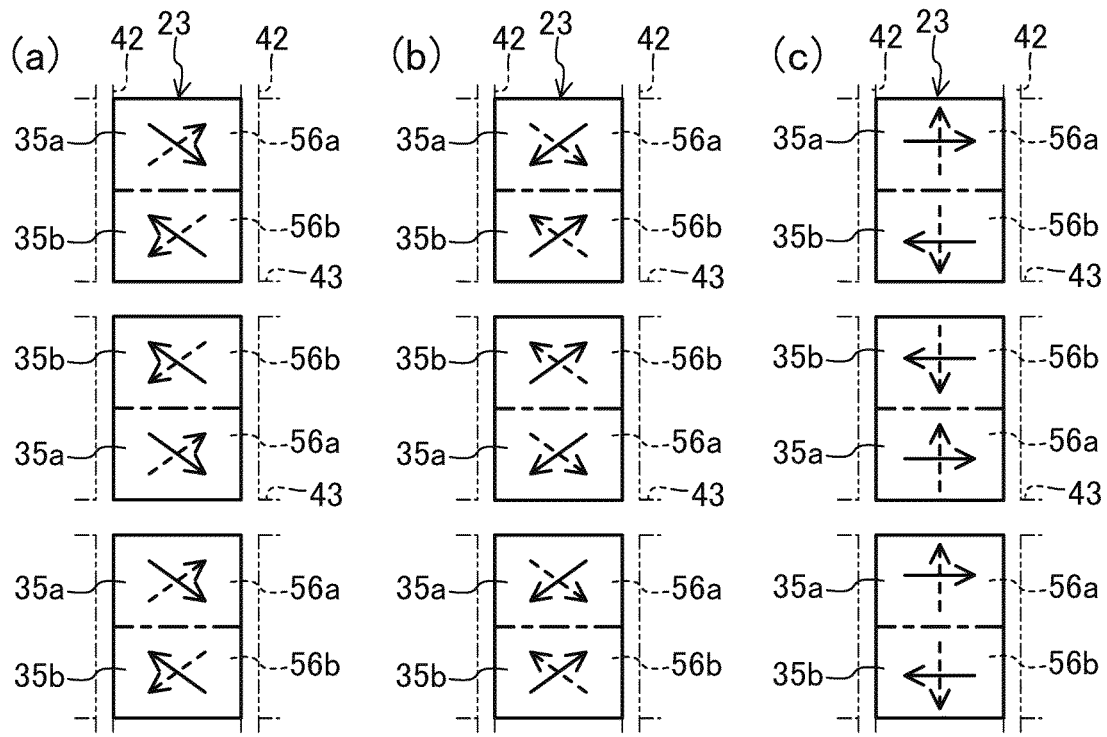
FIG. 19(a)-19(f) are schematic views illustrating alignment treatment according to a variation in the liquid crystal display device according to the variation of the second embodiment.
Figure 19:
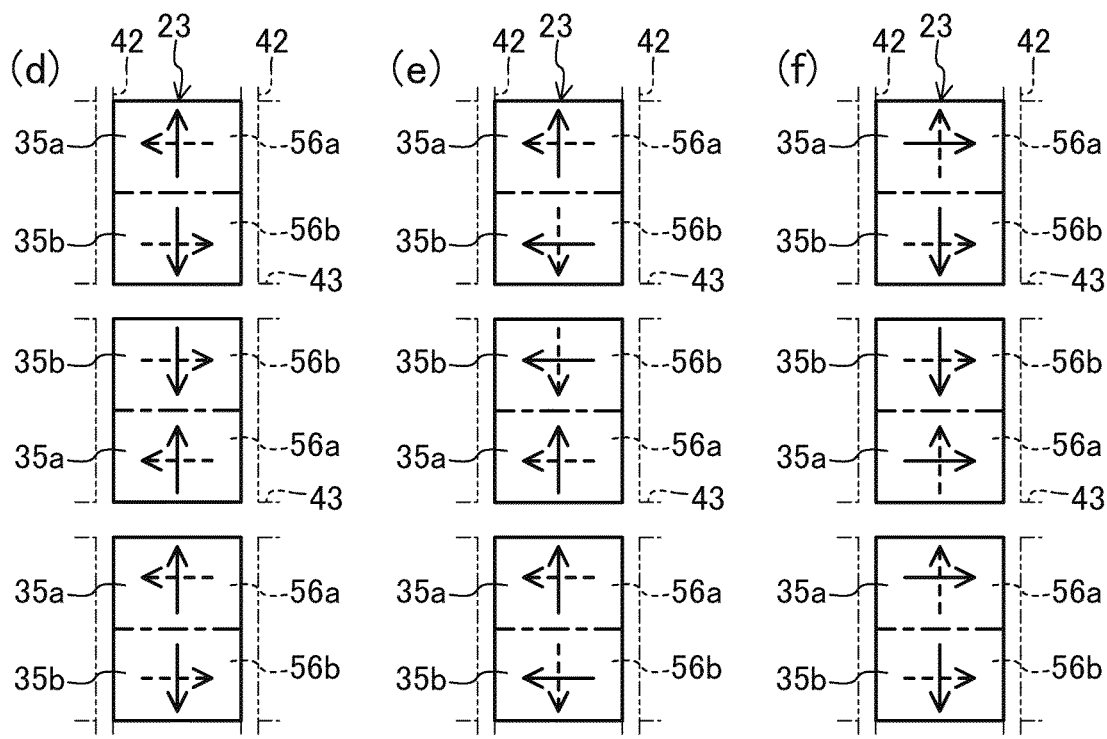
Figure 20:
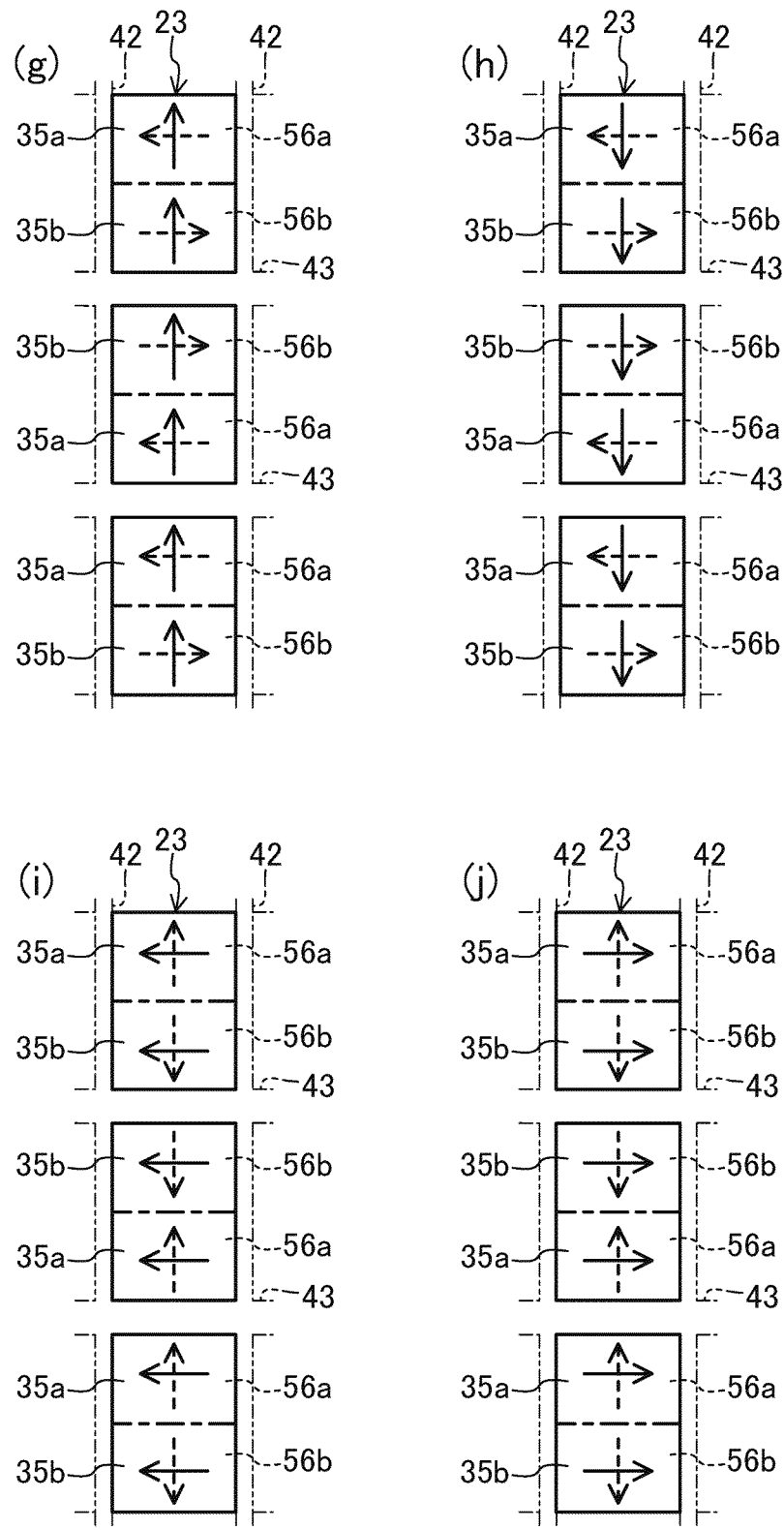
FIG. 20(g)-20(j) are schematic views illustrating the alignment treatment according to the variation following FIG. 19.

Similar to FIG. 11, FIGS. 17 and 18 illustrate various types of patterns of alignment treatment where alignment division is performed along the direction parallel to the source lines 42.

For example, as shown in FIG. 17(a), the directions of alignment treatment of the first regions 35a, the second regions 35b, the third regions 56a, and the fourth regions 56b may not be toward the source lines 42 as in the above-described second embodiment, but may be toward the gate lines 43.

As shown in FIGS. 17(b) and 17(c), one of the first alignment film 35 and the second alignment film 56 may be subjected to alignment treatment in the direction parallel to the source lines 42, and the other alignment film may be subjected to alignment treatment in the direction orthogonal to the source lines 42. The first regions 35a and the second regions 35b may have opposite directions of alignment treatment, and the third regions 56a and the fourth regions 56b have opposite directions of alignment treatment.

As shown in FIGS. 17(d) and 17(e), either one of the first regions 35a or the second regions 35b, and the third regions 56a or the fourth regions 56b may be subjected to alignment treatment in the direction parallel to the source lines 42, and the other regions may be subjected to alignment treatment in the direction orthogonal to the source lines 42. In this case, for example, the absorption axis direction of the first polarizing plate 31 may coincide with the direction of alignment treatment of one of the regions.

As shown in FIGS. 18(g)-18(j), one of the first alignment film 35 or the second alignment film 56 may not be subjected to alignment division, may have the same direction of alignment treatment, and only the other one may have different directions of alignment treatment. For example, as shown in FIGS. 18(g) and 18(h), the first regions 35a and the second regions 35b may have the same direction of alignment treatment parallel to the source lines 42, and the third regions 56a and the fourth regions 56b may have opposite directions of alignment treatment parallel to the gate lines 43.

Similar to the first embodiment, FIGS. 19(a)-20(j) illustrate variations where alignment division is performed along the direction parallel to the gate lines 43 in the liquid crystal display device 1' according to this embodiment. In the variations, the adjacent pixel regions 23 may be arranged so that the regions adjacent to each other with the corresponding one of the gate lines 43 interposed therebetween have the same direction of alignment treatment.

Others

The liquid crystal display device according to the present invention is not limited to the above-described embodiments, and includes other various configurations. For example, while no BM is provided in the above-described embodiments, for example, a BM with a width smaller than or equal to the width of each source line 42 etc. may be provided. BMs may be provided in either one of the source lines 42 or the gate lines 43, which are orthogonal to the direction of alignment division.

The drawings showing the above-described embodiments etc., the directions of alignment treatment indicated by the directional lines (the solid lines) and the directional lines (the broken lines) may be replaced with each other.

INDUSTRIAL APPLICABILITY

The liquid crystal display device of the present invention can be utilized for, for example, displays of PCs and TVs, video cameras, digital cameras, navigation systems, sound reproducing systems (e.g., car audio systems, audio players, etc.), game players, personal digital assistance (e.g., mobile computers, mobile phones, portable video game players, electronic dictionaries, electronic books, etc.), home electronics (e.g., refrigerators, air conditioners, air cleaners, their control terminals, liquid crystal clocks, etc.), etc.

DESCRIPTION OF REFERENCE CHARACTERS 1, 1' Liquid Crystal Display Devices
2 Display Panel
21 Display Region
22 Pixel
23 Pixel Region
30 TFT Substrate (First Substrate)
31 First Polarizing Plate
32 First Phase Plate
33 First Glass Substrate
34 TFT Layer
35 First Alignment Film
35a First Region
35b Second Region
41 TFT
42 Source Line
43 Gate Line
48 Pixel Electrode
50 Facing Substrate (Second Substrate)
51 Second Polarizing Plate
52 Second Phase Plate
53 Second Glass Substrate
54 Color Filter
55 Common Electrode
56 Second Alignment Film
56a Third Region
56b Fourth Region
70 Liquid Crystal Layer
71 Liquid Crystal Molecule
A Light Transmission Axis

The invention claimed is:

1. A normally black liquid crystal display device, comprising:
a first substrate;
a second substrate facing the first substrate;
a liquid crystal layer sealed between the first substrate and the second substrate;
a first polarizing plate provided on the first substrate; and
a second polarizing plate provided on the second substrate;
wherein:
the first substrate includes, on a facing surface,
a plurality of source lines extending in parallel,
a plurality of gate lines extending orthogonal to the source lines,
a plurality of pixel electrodes provided to correspond to pixel regions segmented in a grid by the source lines and the gate lines, and
a first alignment film in contact with the liquid crystal layer,
the second substrate includes, on a facing surface,
a single common electrode facing the pixel electrodes, and
a second alignment film in contact with the liquid crystal layer,
the liquid crystal layer includes liquid crystal molecules arranged so that a light transmission axis orthogonal to the facing surfaces of the substrates substantially coincides with long axes of the molecules when no voltage is applied between the pixel electrodes and the common electrode, the liquid crystal molecules are aligned so that the long axes of the molecules are substantially orthogonal to the light transmission axis by application of a voltage, and each of the pixel regions in the first alignment film and the second alignment film is divided into regions along a direction parallel to either one of the source lines or the gate lines, each of the pixel regions in the first alignment film includes a first region and a second region, and each of the pixel regions in the second alignment film includes a third region facing the first region and a fourth region facing the second region, at least one pair of the first region and the second region, or the third region and the fourth region has different directions of alignment treatment, in an adjacent pair of the pixel regions, pairs of the first regions, the second regions, the third regions, and the fourth regions are adjacent to each other with corresponding one of the lines interposed therebetween, the first region and the third region are subjected to alignment treatment in opposite directions, the second region and the fourth region are subjected to alignment treatment in opposite directions, and as viewed from the light transmission axis, the first polarizing plate is provided so that an absorption axis direction of the first polarizing plate is substantially shifted from the direction of alignment treatment of the first alignment film by an angle of 45°, and the second polarizing plate is provided so that an absorption axis direction of the second polarizing plate is orthogonal to the absorption axis direction of the first polarizing plate.

2. The liquid crystal display device of claim 1, wherein the first region and the second region are formed to have opposite directions of alignment treatment, and the third region and the fourth regions are formed to have opposite directions of alignment treatment.

* * * * *